United States Patent [19]
Runge

[11] 3,808,520
[45] Apr. 30, 1974

[54] TRIPLE COIL INDUCTION LOGGING METHOD FOR DETERMINING DIP, ANISOTROPY AND TRUE RESISTIVITY

[75] Inventor: Richard J. Runge, Anaheim, Calif.

[73] Assignee: Chevron Research Company, San Francisco, Calif.

[22] Filed: Apr. 4, 1973

[21] Appl. No.: 347,747

Related U.S. Application Data

[63] Continuation-in-part of Ser. No. 321,613, Jan. 8, 1973, abandoned, which is a continuation of Ser. No. 795,209, Jan. 30, 1969, abandoned.

[52] U.S. Cl. .................................................. 324/6
[51] Int. Cl. ........................... G01v 3/10, G01v 3/18
[58] Field of Search .................................... 324/6, 8

[56] References Cited
UNITED STATES PATENTS

| | | | |
|---|---|---|---|
| 2,919,397 | 12/1959 | Morley | 324/6 |
| 3,014,177 | 12/1961 | Hungerford et al. | 324/8 |
| 3,042,857 | 7/1962 | Ronka | 324/6 X |
| 3,187,252 | 6/1965 | Hungerford | 324/6 |
| 3,388,323 | 6/1968 | Stripling | 324/8 |
| 3,389,331 | 6/1968 | Vexler | 324/8 |
| 3,391,335 | 7/1968 | Patton et al. | 324/8 |
| 3,510,757 | 5/1970 | Huston | 324/6 |
| 3,609,521 | 9/1971 | Desbrandes | 324/6 |

Primary Examiner—Gerard R. Strecker

[57] ABSTRACT

A method of determining dip, anisotropy, and true resistivity of an earth formation dipping relative to a well bore traversing it by inducing an electromagnetic field in the earth formation with an alternating current transmitting coil to cause electrical currents to flow in the earth formations to generate an e.m.f. in three detector coils spaced from the transmitting coil. The coils lie in mutually perpendicular planes, preferably with a common center point for their respective axes. By combining the signal from two of the coils and taking the ratio of the square root of the sum of the squares of these signals to the signal in the other coil, an electrical quantity representative of the dip and anisotropy of the earth formation is generated. With a knowledge of dip of the formation from a conventional dipmeter log and said electrical quantities, the anisotropy (the square root of the ratio of vertical to horizontal resistivity of the formation) if any, can be identified. In the absence of other dip information, the electrical anisotropy and dip of the formation is identified by using said electrical quantities with a conventional electric log of the non-inductive type. From such anisotropy, true vertical resistivity of the formation can be determined provided true horizontal resistivity is known. No knowledge of the strike of the formation relative to the borehole is required to measure either dip or anisotropy.

7 Claims, 10 Drawing Figures

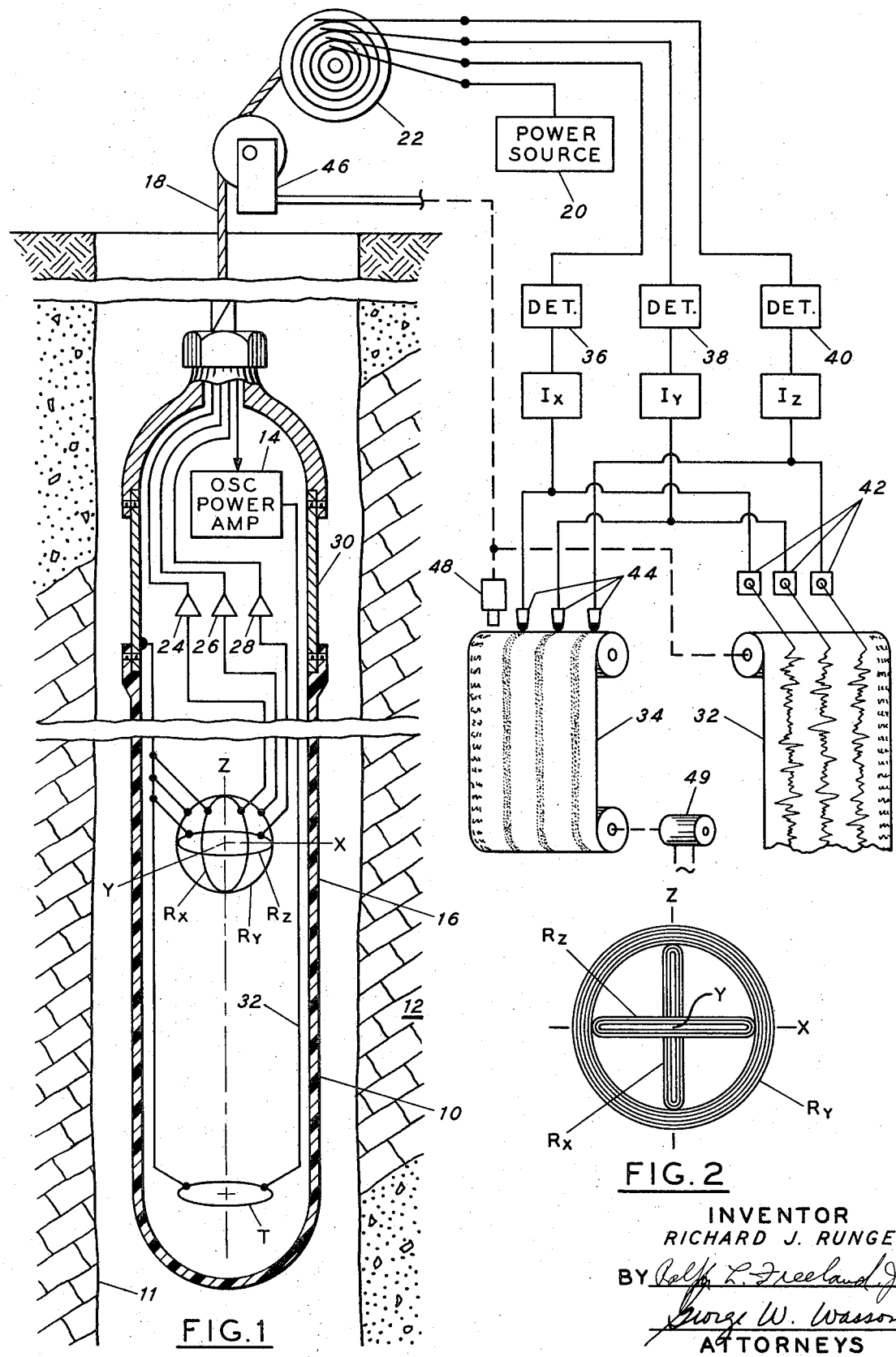

TRIPLE COIL INDUCTION LOGGING METHOD FOR DETERMINING DIP, ANISOTROPY AND TRUE RESISTIVITY

This application is a continuation-in-part of application Ser. No. 321,613, filed Jan. 8, 1973, which in turn is a continuation of application Ser. No. 795,209, filed Jan. 30, 1969, both now abandoned.

FIELD OF INVENTION

The present invention relates to electrical induction well logging. More particularly, it relates to a method of identifying dip and anisotropy of an earth formation independent of strike relative to a borehole traversing the formation by detecting the alternating current induced in receiver coils having three mutually perpendicular planes and resulting from distortion of the induced electrical current flow field by dip and anisotropy of an earth formation when an electromagnetic field is induced therein by an alternating current signal. The detected currents are recorded as an indication of such dip and anisotropy of the formation. Resolution of anisotropy, dip, and true vertical and horizontal resistivity is obtained by combination of such recorded currents with conventional non-inductive electrical induction, electrical and dip meter logs.

OBJECT OF THE INVENTION

It is an object of this invention to fully identify the dip, anisotropy, true horizontal resistivity, and true vertical resistivity (horizontal and vertical being defined in terms of the direction of the borehole axis) from passive electrical measurements made in accordance with this invention by an arrangement of passive receiving coils having mutually perpendicular axes and a substantially common center point relative to and spaced apart from a passive induction electric transmitting coil. The electrical signals so generated are then combined with electrical measurements or other known data regarding the earth formation to fully define the earth formation's electrical, and inferentially physical, characteristics with respect to dip and anisotropic properties; such properties are directly related to the true vertical and true horizontal resistivities.

While resolution of dip and anisotropy of any bed is a matter of interest to petroleum engineers and oil explorers, these characteristics are particularly useful in understanding and analyzing the type of measurements described in my issued U. S. Pat. No. 3,256,480. As disclosed in that patent, a knowledge of the earth's vertical resistivity is sometimes important in detecting the presence or absence of a resistivity anomaly, such as a salt dome, lying at some distance from a well bore. There is also disclosed in my application, Ser. No. 662,981, filed Aug. 24, 1967, a method of measuring the vertical resistivity of a geological column extending over a given length, and sometimes bridging several parallel earth formations cut by a well bore. As disclosed in that application, the true vertical resistivity measured over such a macroscopic sample, relative to the borehole, is also the vertical anisotropy (perpendicular to bedding planes).

As distinguished from my previously filed application and the issued patent, the present method is directed to identification of anisotropy of an earth formation that is dipping relative to the well bore, or where the earth formation is non-isotropic in electric conductivity (anisotropy) such as shale formations, or dirty sand formations, as well as limestone formations. Such formations have tortuous paths (or conductivity) that are different along the bedding plane as compared to those across the bedding plane. The present invention is directed to a method of identifying this across the bed anisotropy and dip of such an anisotropic earth formation.

In a preferred form of apparatus for carrying out the method, three induction receiving coils are positioned to intersect at substantially a common center and at a point vertically displaced from an induction transmitter coil whose plane is horizontally oriented. The transmitted coil is energized at a frequency from a few kilocycles to a few hundred kilocycles, to establish in the earth formation an alternating electromagnetic field which has an associated alternating electrical current field that is distorted by the anisotropic character and conductivity of an earth formation traversed by the well bore and subjected to such radiation. By measurement of the voltages or currents induced in the three coils and a knowledge of either the dip of the earth formations traversing the well bore from a dip meter or a conventional non-inductive E-log, representing resistivity or conductivity of the earth formations, it is possible, in accordance with the teaching of the present specification, to identify completely the anisotropy, dip, and cross-bed, or true vertical, resistivity of the formation. In addition, the true horizontal resistivity can be obtained via these measurements. In accordance with a further embodiment of the invention, and with a knowledge of direction of the transmitter and receiver coils with respect to magnetic North or any known direction mark, a true strike measurement of the earth formation relative to a well bore can be indicated.

PRIOR ART

It has been known in the prior art to determine anisotropy of earth formations (or dip) by using rotating or dynamic measuring elements, such as a gyro compass and a rotating magnetic coil that keeps tract of the position of a logging instrument in a well bore with respect to a reference marker at the earth's surface. Maintenance and continuity of operation of such tools in a commercial well log operation is sufficiently difficult so that they are not widely used. It is considered quite undesirable to use motor driven equipment in a logging instrument because both power needs and heat generated in a tool intended to operate as deep as 15,000 feet at temperatures up to 300°F and external pressures of up to 7,500 psi. For this reason there has been a long standing need for a system that will determine anisotropy and dip of an earth formation with passive electrical detecting elements and conventional electrical well log information, as disclosed herein.

Further objects and advantages of the invention will become apparent from the following detailed description read with the accompanying drawings that form a part of this application.

FIG. 1 is a schematic representation of a borehole induction electric logging system suitable for carrying out the method of this invention by detecting induced electromagnetic currents in dipping earth formations, including a surface recording system indicating and recording such currents.

FIG. 2 is a cross-sectional view through the logging tool in the direction of arrows 2—2, illustrating a preferred coil construction.

Figure 8:
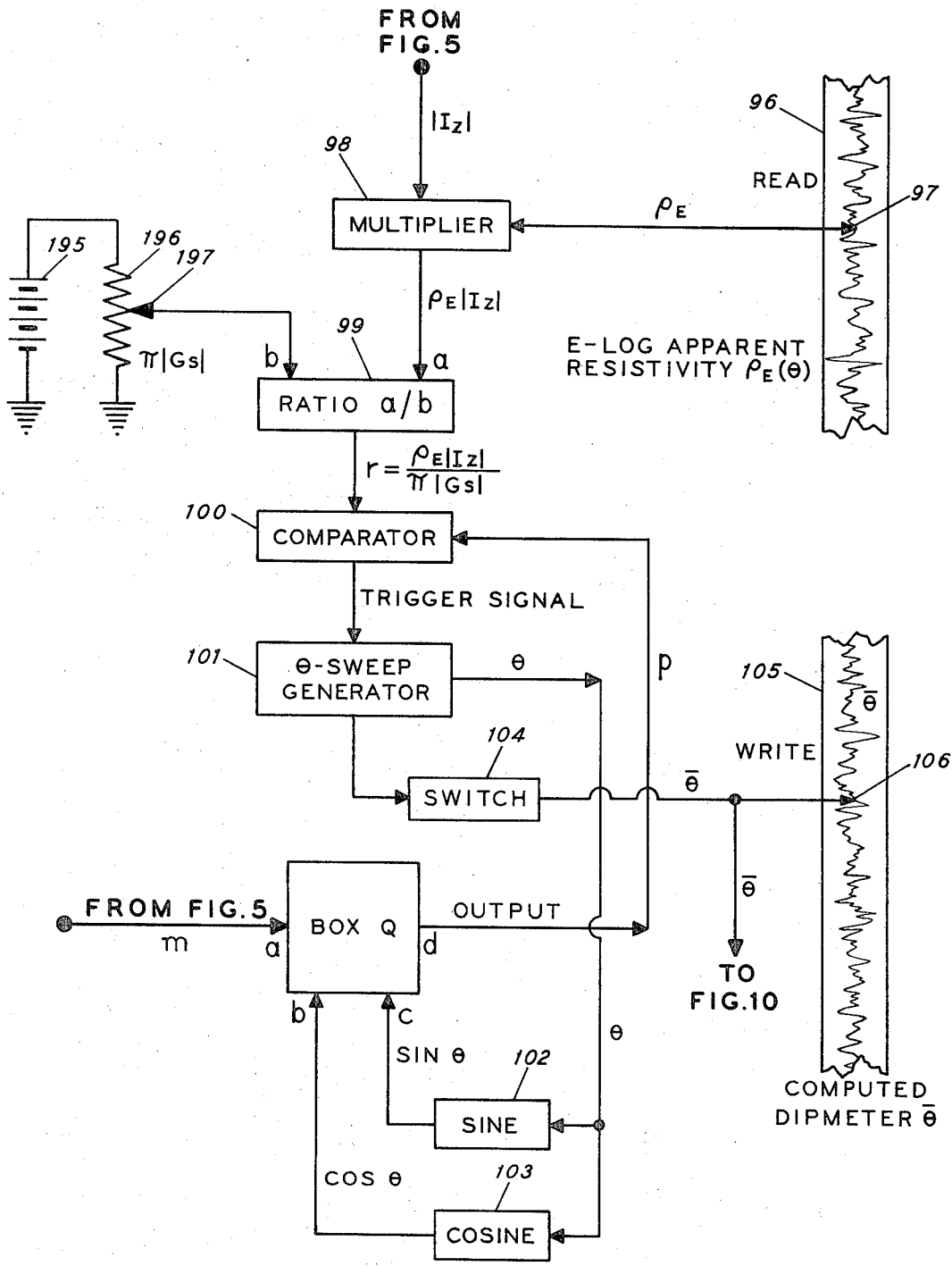
Figure 9:
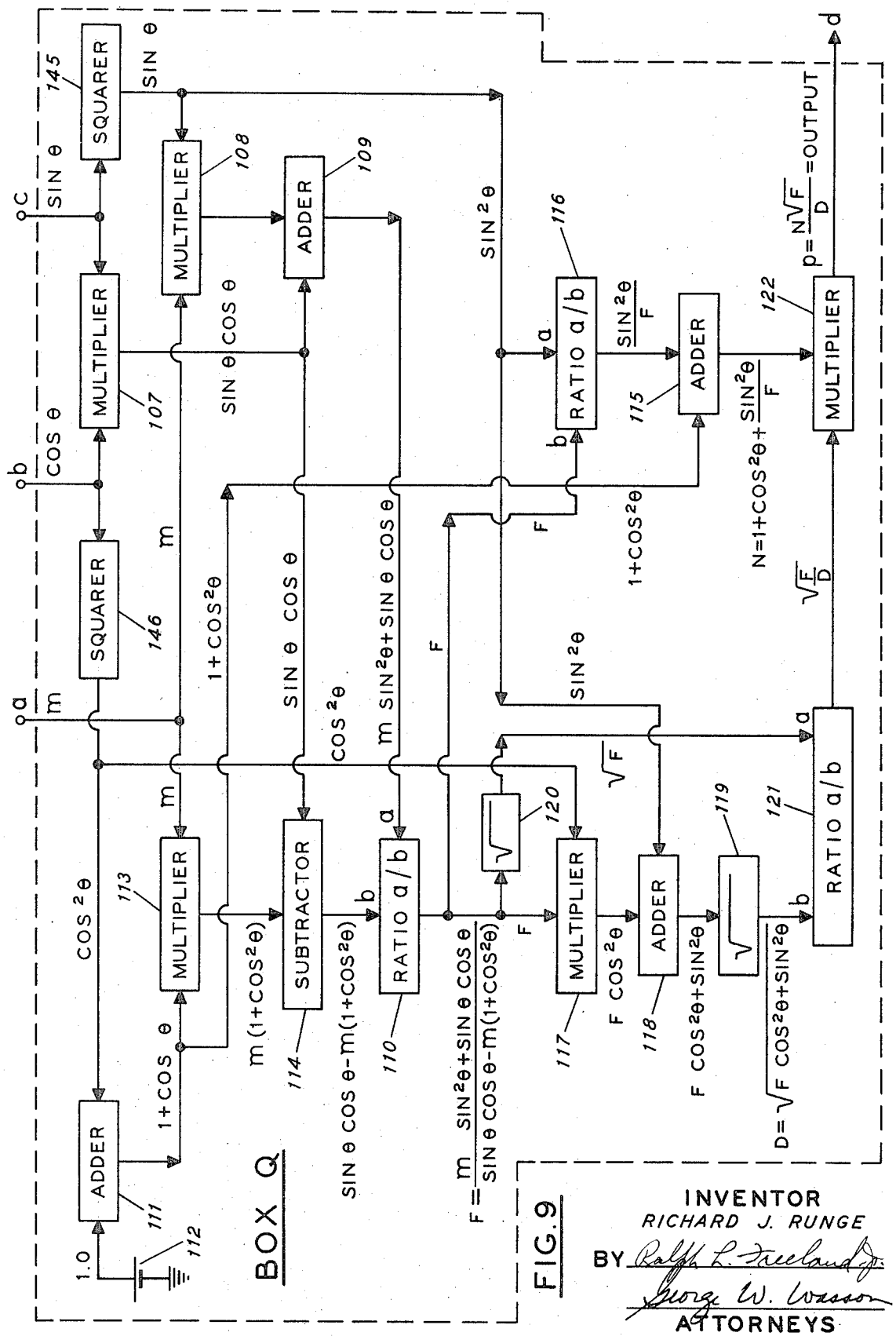

FIGS. 8 and 9 together form a flow diagram of a system to calculate and record true vertical resistivity, true horizontal resistivity, dip and anisotropy of earth formation traversed by a borehole from the recorded electrical signals from apparatus according to FIG. 1 and an apparent resistivity log from a conventional non-inductive E-log without use of a dipmeter log. In the figure, | Gs | is the magnitude of the geometric factor of the $R_Z$ coil.

Figure 10:
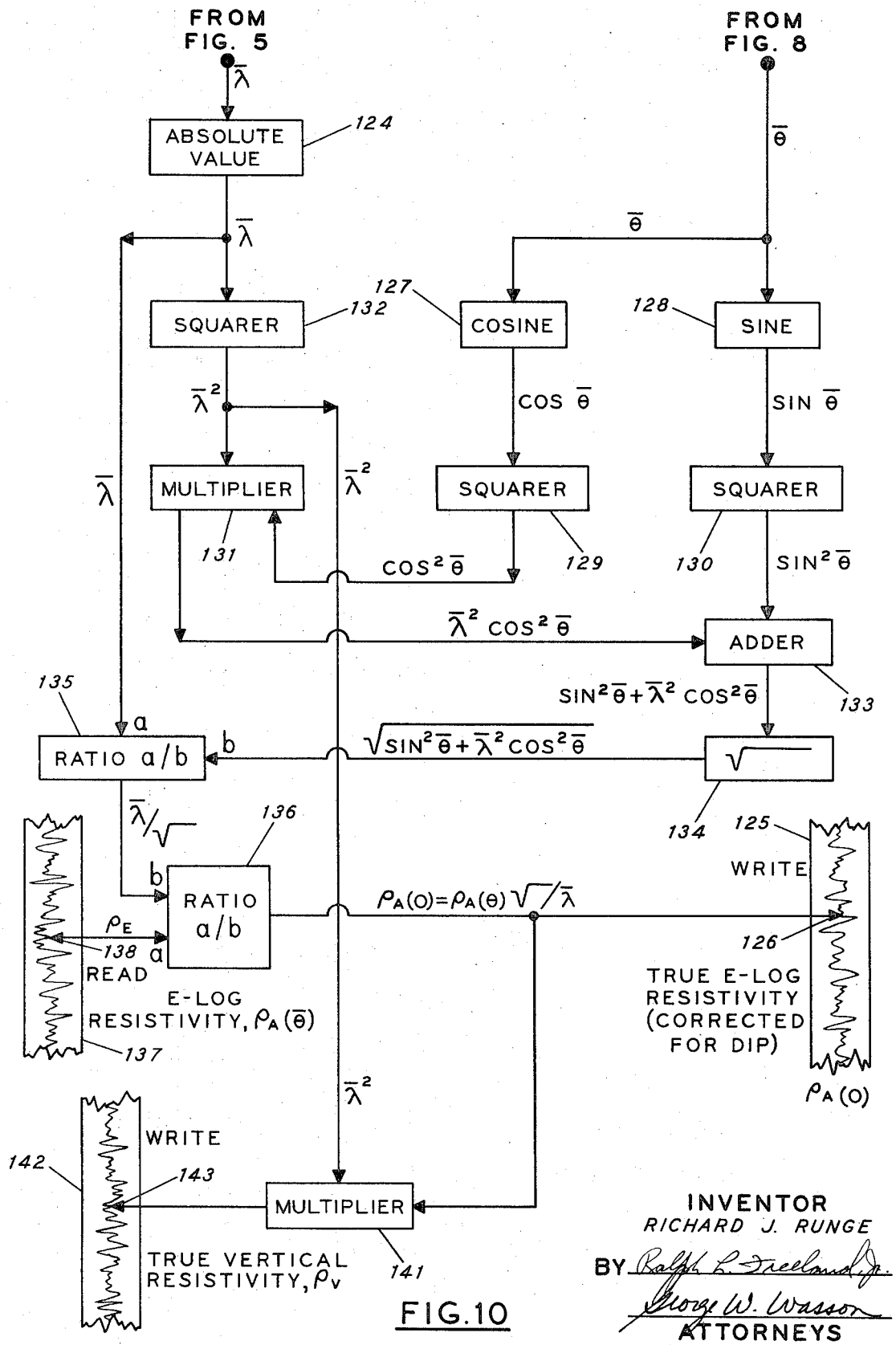

FIG. 10 is a flow diagram of the calculations performed by Unit Q in FIG. 8.

Referring now to the drawings and in particular FIG. 1, there is shown in schematic form an induction logging system constructed to perform the method of the present invention. As particularly distinguished from conventional induction logging systems using one or two receiving coils, the present arrangement includes three coils designated as $R_X$, $R_Y$ and $R_Z$. Preferably, these coils have a common center point and the electrical axis of each coil is mutually perpendicular to the axes of the other two coils. The coils are, of course, positioned within a pressure resistant but non-conducting enclosure 10 forming the lower end of logging sonde 16. They are vertically spaced along the Z axis at a known distance from a transmitter coil, designated as T. As indicated schematically in the drawing, and better seen in FIG. 2, the coils have been designated by their axes of symmetry. For example, coil $R_Z$ has its axis parallel with the Z or vertical axis of sonde 16. Correspondingly, at 90° to that axis, both the axes of coils $R_X$ and $R_Y$ are parallel to the X and Y axes, which arbitrarily are made mutually perpendicular to each other and to the Z axis. The $R_Z$ and the T coils are, of course, conventional to commercially operated electrical induction logs. The $R_X$ and $R_Y$ coils are not. While not shown, it is of course understood that the uniformity of the field established by the T coil may be assisted by adjacent focusing coils.

In operation of such an induction logging system it is necessary to supply an alternating current to transmitter coil T at a frequency of a few hundred Hz to 50 KHz to generate an alternating current magnetic field in the adjacent formation, such as 12, which for the purposes of the present explanation is indicated as dipping by an angle $\theta$ with respect to the Z axis. Source T is driven by oscillator 14. Power is supplied to oscillator 14 through the supporting well logging cable 18 and slip ring assembly 22 by source 20, located at the earth's surface. Multiconductor cable 18 also transmits signals from each of the three receiving coils $R_X$, $R_Y$, $R_Z$ after amplification respectively in amplifiers 24, 26 and 28. These amplifiers are also located in sonde 16, and like the power oscillator 14 are preferably within the pressure resistant housing portion, such as steel section 30. Steel section 30 also serves as a common ground connection through wire 32 for all of the transmitting and receiving coils. Each of the three receiving coils detects any components of the induced electromagnetic field that generate electrical currents therein. These currents are then recorded either optically, as on oscillograph paper 32, or magnetically for further processing in accordance with the present invention, on magnetic tape 34. In each case, the current from the three individual receiving coils in first sent through a detector 36, 38, and 40, respectively, to generate a value indicated as output $I_X$, $I_Y$ and $I_Z$. These outputs run to galvanometers 42 to record visually on oscillograph paper 32, or are recorded as magnetic signals by heads 44 on magnetic tape recorder 34. Reference depth of logging sonde 16 in well bore 11 is through cable depth measuring unit 46 which directly drives paper chart 32, or a signal marker 48 on magnetic tape 34. Drive for tapes recorder 34 may be independent of the drive of cable 18 through depth measuring unit 46. In such an arrangement, electric motor 49 drives tape 34 at a constant speed, with fiducial marks being made by marker 48 at the correct position relative to signals $I_X$, $I_Y$ and $I_Z$.

Figure 4:
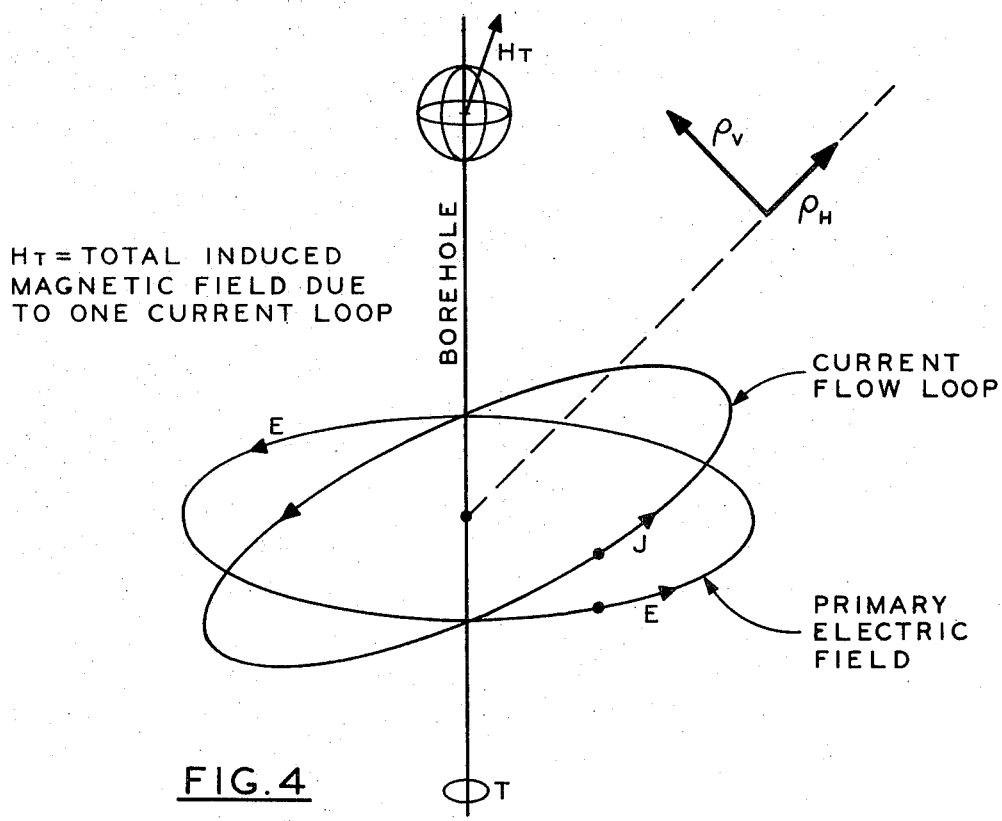
FIG. 4 is a diagram of electrical field and magnetic field vectors generated and induced by the coil arrangement in the tool shown in FIG. 1, as such vectors are influenced by anisotropic media dipping relative to the axes of the generated field.
Figure 3:
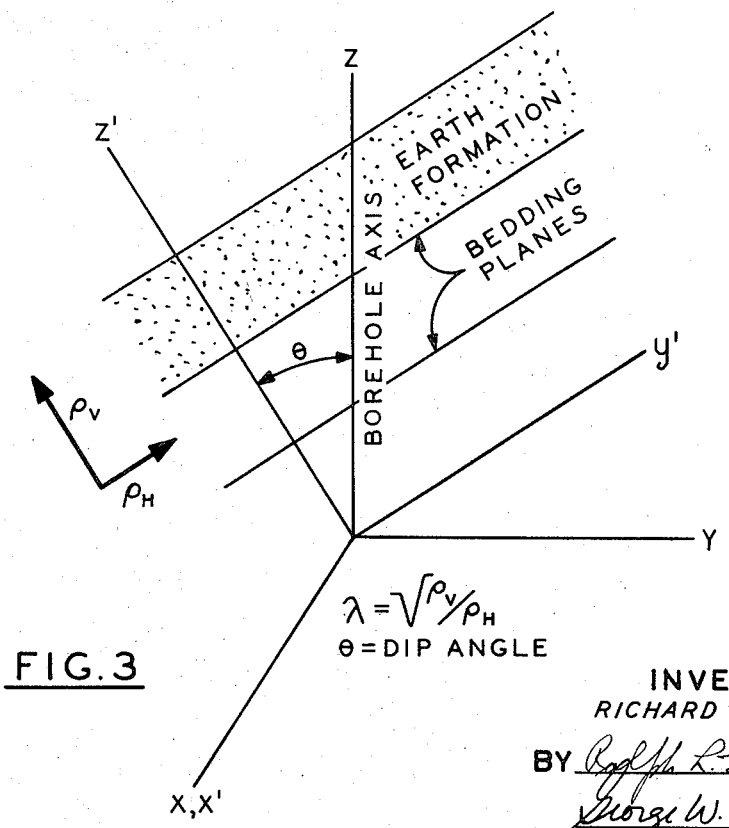
FIG. 3 is an isometric representation of an earth formation in which the bedding dips relative to the axis of the borehole, useful in explaining the invention.

Reference is now made to FIGS. 3 and 4 to explain the method of the present invention for using apparatus of FIG. 1 to determine electrical anisotropy, dip, strike and true vertical or horizontal resistivity of earth formations cut by the well bore. As best seen in FIG. 3, the borehole axis is labeled as lying along a vertical line designated as Z. As indicated, the dipping beds, or bedding planes, of earth formations cut by the borehole are taken as being tilted about the X, Y' axis so that its axis Z is normal (vertical) to the bedding planes and is displaced from the Z axis by an angle $\theta$. The bedding planes are then parallel to both the X, X' axis and tilted axis Y'. $\theta$ is the dip angle. By definition the anisotropy of the bedding is designated as $\lambda$, and is the square root of the ratio of the vertical resistivity ($\rho_V$) divided by the horizontal resistivity ($\rho_H$). In sedimentary earth formations the resistivity perpendicular to the bedding planes is almost always greater (and conductivity less) than the horizontal resistivity unless the formation is isotropically uniform, such as an unbedded sand or a limestone, so that the way the beds were laid down by sedimentation did not produce a difference in the resistivity or conductivity across and along the bed.

FIG. 4 indicates the influence of a tilted bed, of the type shown in FIG. 3, on a primary electric field generated by a point source, such as transmitter coil T, in a homogeneous medium, or a non-dipping bed. The current flow loop and the primary electric field are coincident in such a medium; but, in an earth formation having anisotropy and dip, the current flow loop is tiled as indicated in the diagram.

FIG. 4 shows transmitter coil T with its axis parallel to the borehole and the three triplet receiver coils, $R_X$, $R_Y$ and $R_Z$, with centers at the center of the borehole. An oscillatory current in transmitter coil T produces an oscillatory electric field in the medium as shown in FIG. 4, where the electric field vectors (indicated as $\vec{E}$) are tangent to circles whose planes are perpendicular to the borehole. Shown also is a loop of current induced for the case in which the axis of anisotropy is tilted away from the borehole. The current loop is itself tilted and the plane of the current loop is no longer perpendicular to the borehole. The reason this happens is substantially as follows: We know that in accordance with Ohm's Law, in the case of an isotropic conducting medium, the current density vector $\vec{J}$ will be parallel to the electric field vector, $\vec{E}$. However, when the medium is anisotropic, and in particular when the conductivity tensor has off-diagonal elements, then in general, the current density vector will not be parallel to the electric field vector. Such a situation actually exists in the case of a dipping anisotropic medium where the axis of anisotropy makes an arbitrary angle $\theta$ with respect to the borehole. In FIG. 4, one sees immediately that the total magnetic field $H_T$ induced by such tilted current loops at the transmitter coils T makes an angle with respect to the borehole axis and is no longer parallel to the borehole. Thus, vertical coils $R_X$ and $R_Y$, as well as coil $R_Z$, can have components of the magnetic field perpendicular to the planes of these coils. In other words, the possibility now exists for all three coils to be able to pick up a signal from the fluctuating magnetic field. When there is no dip, $\theta$, then the situation returns to the conventional one even though there is anisotropy. In other words, in this case the total magnetic field is perpendicular to the plane of coil $R_Z$, but is parallel to the plane of coils $R_X$ and $R_Y$.

When there is no anisotropy, then the current loop follows the tangential electric field of the transmitter and is in a plane perpendicular to the borehole. In this case only horizontal coil $R_Z$ sees a fluctuating magnetic field component perpendicular to its plane. It is a detection of the quadrature voltages in $R_X$ and $R_Y$ by the total induced magnetic field $H_T$ which are used in accordance with the present invention to determine the dip or anisotropy and other quantities discussed below.

Figure 5:
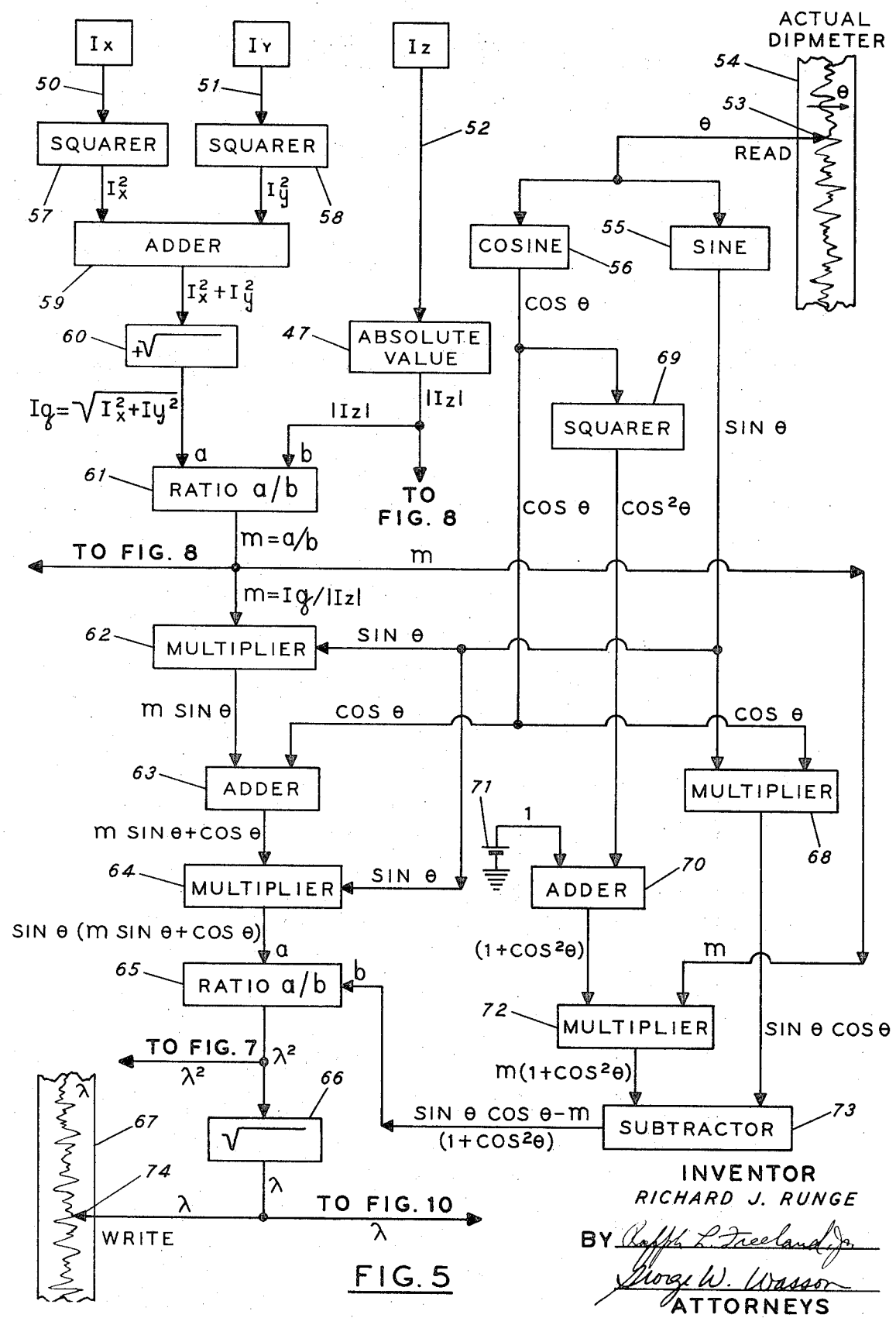
FIG. 5 is a data flow diagram of an arrangement to use the induced electrical currents measured in accordance with the apparatus of FIG. 1 with information from a dip meter log of the same depth interval to generate a representation of the electrical anisotropy of an earth formation traversed by the borehole.

ANISOTROPY $\lambda$ FROM $I_X$, $I_Y$ AND $I_Z$ AND DIP ANGLE $\theta$ FROM DIPMETER The arrangement of FIG. 5 indicates a system for computing from the information derived from apparatus such as that shown in FIG. 1 the anisotropy of an earth formation when there is available information concerning the dip angle of the formation. Normally, such dip angle may be known from a conventional dip meter log, and apparatus in accordance with FIG. 5 makes use of the three signals obtained from the $R_X$, $R_Y$, and $R_Z$ coils and the dip angle $\theta$ at the same depth interval to calculate the value of $\lambda$, the anisotropy. FIG. 5 apparatus is arranged to compute the formula:

$$\lambda = \sqrt{\sin\theta\,(m\sin\theta + \cos\theta)/\sin\theta\cos\theta - m(1 + \cos^2\theta)}$$

where $\theta$ = dip angle and, $$m = \sqrt{I_X^2 + I_Y^2}\,/\,|I_Z|$$

From this formula, $\lambda$ is calculated automatically by the arrangement of FIG. 5 which uses as input the currents $I_X$, $I_Y$ and $I_Z$ and the dip meter reading $\theta$. These inputs are indicated schematically and are understood to be derived from a magnetic tape such as that shown in FIG. 1, where the three values of the coils are simultaneously applied to the input lines 50, 51, and 52. The input of the value $\theta$, the dip at the same depth, is read from a reading head 53 on dip meter chart, designated 54 coupled to sine, cosine converters, designated 55 and 56, respectively. The signal $I_X$ and $I_Y$ from lines 50 and 51, respectively, from the $R_X$ coil and the $R_Y$ coils are square by units 57 and 58 and applied to an adder 59 to give the quantity $I^2_X + I^2_Y$. This value is then converted through a square root device 60 to produce the quantity $I_Q = \sqrt{I_X^2 + I_Y^2}$. This value is then applied to a ratio device 61 whose input is both $I_Q$ and the absolute value of $I_Z$ generated by an absolute value unit (preferably a rectifier) 47. The ratio of $I_Q$ to $|I_Z|$ generate the quantity $m$ in unit 61. In the numerator of the above-noted equation, $m$ is to be combined with $\sin\theta$ from unit 55. This is done in multiplier 62. $m \sin\theta$ is then combined with $\cos\theta$ by adder 63 so that the combined value can be multiplied by $\sin\theta$ in multiplier 64. The output of multiplier 64 forms the numerator, $\sin\theta(m\sin\theta + \cos\theta)$. This value is fed to ratio device 65 where it is to be divided by the denominator to produce the value $\lambda^2$. Extraction of the square root of $\lambda^2$ is through square root device 66 so that the value $\lambda$ can be written, either in graphic form, or as a magnetic signal, on output tape 67 by writing head 74.

The denominator of the above equation is generated by combining $\sin\theta$ and $\cos\theta$ in multiplier 68 whose inputs are direct from cosine unit 56 and sine unit 55. The remainder of the denominator is generated by first squaring $\cos\theta$ in unit 69 and then combining $\cos^2\theta$ with the unit value, 1, in adder 70, whose input is from squarer 69 and constant value 1, indicated as being generated by a battery 71. The output of added 70 is then $1 + \cos^2\theta$, which is then multiplied in unit 72 by $m$, derived from ratio unit 61. The output of multiplier 72 and 68 are then combined in subtractor 73 to produce the final value of the denominator, namely, $\sin\theta\cos\theta - m(1 + \cos^2\theta)$ supplied to ratio device 65.

One check of the validity of the foregoing equation can be seen by the assumption of zero dip; under such conditions the flow of current in coils $I_X$ and $I_Y$ will be essentially zero so that the value $m$ also becomes zero, and the measured value of $\lambda^2$ is 1, also indicating that horizontal and vertical resistivity, or conductivity, are equal.

Figure 6:
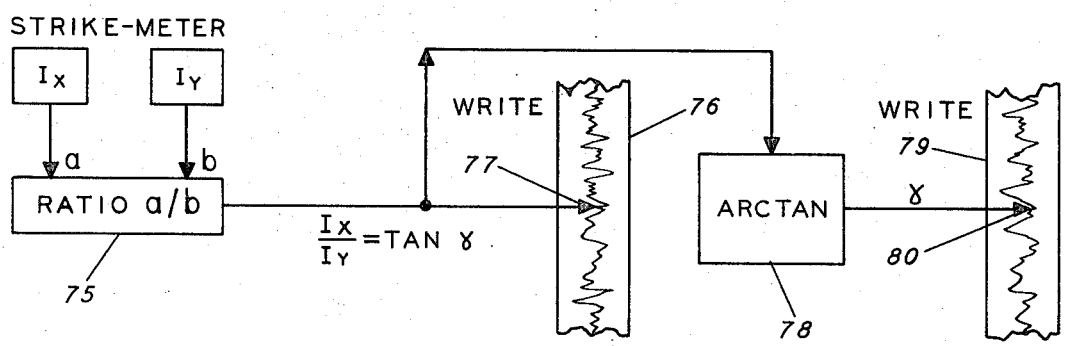
FIG. 6 is a flow diagram of a system to use the recorded electrical signals from apparatus of FIG. 1 to indicate strike of anisotropic, dipping beds.

The formation derived from the tool shown in FIG. 1 may also be used to indicate directly strike of formations cut by the borehole. This information is developed directly from current flow in the coils $R_X$ and $R_Y$ and recorded as current values $I_X$ and $I_Y$. As indicated in FIG. 6, these two values are compared through a ratio measuring device 75. The ratio output $I_X/I_Y$ is the tangent of angle $\gamma$, indicated as the strike angle. This value may be either directly recorded on tape 76 by head 77, or the angle directly written by conversion of the tangent $\gamma$ by an arctangent converter 78 to write the value of $\gamma$ directly on tape 79 by head 80. In present nomenclature, the value of the angle is taken as perpendicular to the well bore, or Z, axis and parallel to the XY plane, with angle $\gamma$ being defined as a departure from a known marker such as true north. The XY plane is assumed to be parallel to the earth's surface so that the angle $\gamma$ between the strike and true north is represented as the direction at which a line on the earth's surface and a bed dipping at angle $\theta$ would intersect it.

Otherwise stated, $\gamma$ is the angle between the plane of one or the other of the vertical coils $R_X$ or $R_Y$ and the strike direction of the dipping earth formation traversed by the well bore. Instantaneous values recorded on strip chart 79 is, of course, in accordance with the depth of the recorded signals taken from the logging sonde as illustrated in FIG. 1.

True Resistivity or Conductivity from FIG. 5 and Conventional Induction Log

Figure 7:
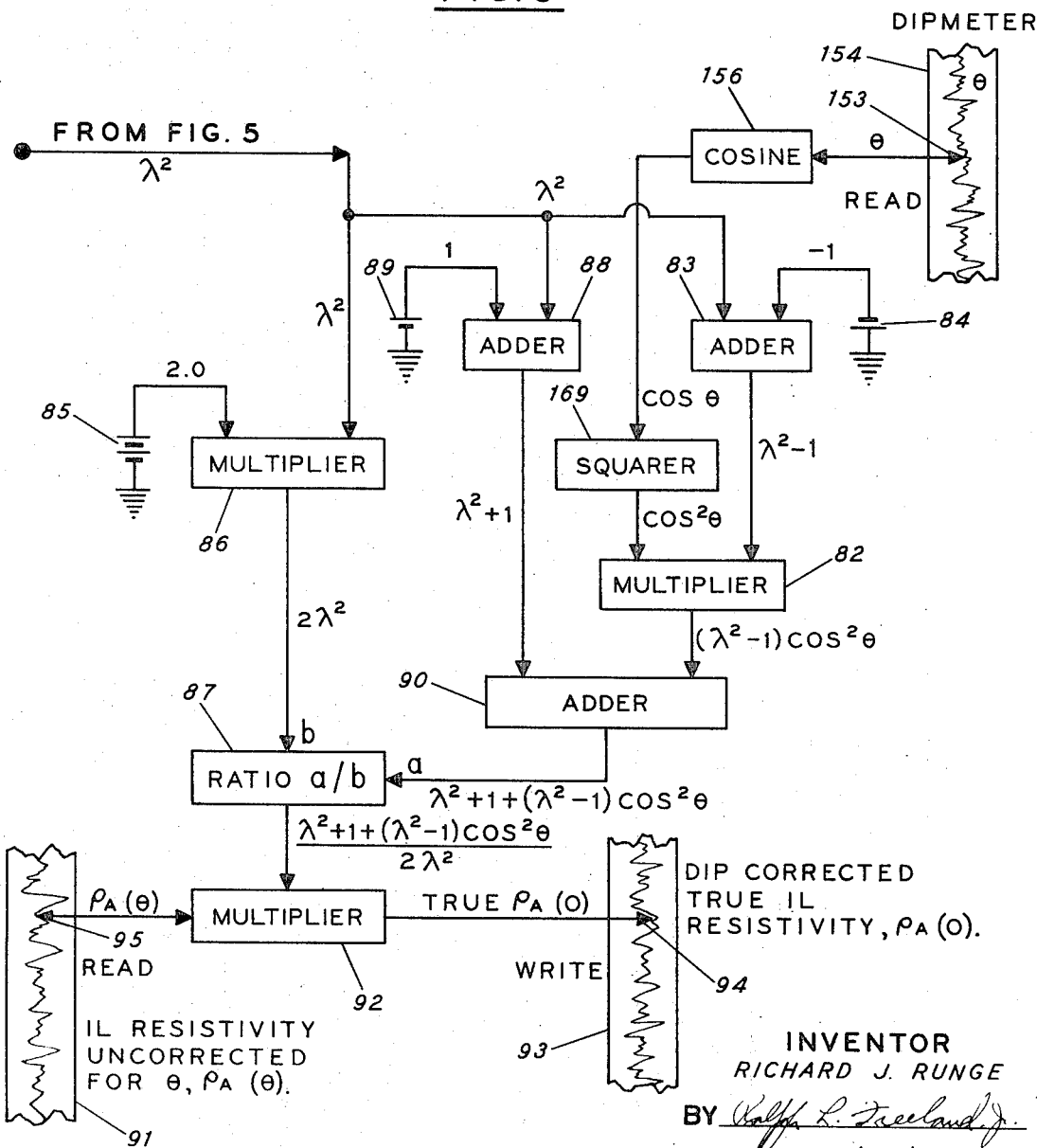
FIG. 7 is a flow diagram of a system to calculate and record true, or dip-corrected, resistivity from the recorded electrical signals from the apparatus of FIG. 1 and an uncorrected resistivity trace of the same depth interval obtained from a conventional induction log.

Reference is now made to FIG. 7 in which there is illustrated a system for calculating and displaying the true resistivity of an earth formation, using information derived from the true anisotropy value as derived by the practice of the method illustrated by the arrangement of FIG. 5, including a dip meter measurement of dip angle $\theta$ and a conventional induction log of the same depth interval. The values are calculated automatically through apparatus of FIG. 7 for calculating the formula:

$$\rho A^{(0)}/\rho A^{(\theta)} = ]\lambda^2 + 1 + (\lambda^2 - 1) \cos^2\theta/2\lambda^2]$$

By the above formula, the ratio of the true value $\rho A^{(0)}$ for no dip to the apparent resistivity $\rho A^{(\theta)}$, as measured by the conventional induction log, with dip $\theta$ present, is entirely a function of dip angle $\theta$ and the anisotropy $\lambda$ as given by the above formula. FIG. 7 shows how to combine the values to produce the uncorrected resistivity $\rho_A(\theta)$, as well as the true resistivity $\rho_A(O)$, or alternatively, true conductivity.

For completeness in description of FIG. 7, the value of the dip angle $\theta$ is again illustrated as being derived from a dip meter record, such as tape 154 through reading head 153. However, in this arrangement, only the cosine $\theta$ need be derived, and this can be dome by cosine converter device 156, which is then transmitted to a squarer such as 169 for combination with the value $\lambda^2 - 1$ in multiplier 82. $\lambda^2 - 1$ is derived from the $\lambda^2$ value, indicated as the output of ratio device 65, in FIG. 5. This value is combined in adding circuit 83 with $a - 1$ value derived from a constant current source such as battery 84. $\lambda^2$ is also multiplied in unit 86 by a constant 2, derived from battery 85, to generate the denominator $2\lambda^2$ supplied to ratio device 87. The remainder of the numerator is supplied by feeding $\lambda^2$ to adder 88 where it is combined with constant voltage supplied by battery 89 to form the sum $\lambda^2 + 1$. The output of adder 88 and multiplier 82 are then combined in adder 90 to form the numerator $\lambda^2 + 1 + (\lambda^2 -1) \cos^2\theta$. By then reading through head 95 from chart 91, which contains the uncorrected induction log resistivity, and combining this value through multiplier 92, the true resistivity $\rho_A(O)$ is written on dip corrected chart 93 by head 94. This trace is likewise recorded as a function of depth in synchronism with the input data obtained from dip meter 54, induction log resistivity record 91, and depth information for each value of $\lambda^2$ produced by the arrangement of FIG. 5.

Anisotropy and Dip Angle $\theta$, from $I_X$, $I_Y$ and $I_Z$ and a Non-Inductive Electric Log FIGS. 8, 9 and 10 disclose a system for obtaining simultaneously dip angle $\theta$ and anisotropy $\lambda$ from logging data recorded in accordance with the apparatus of FIG. 1, and a properly depth synchronized non-inductive conventional electrical log for the same depth interval under consideration. Such an arrangement permits these values to be determined at any depth without direct use or availability of a dip meter log. The present arrangement is obviously useful where there is a non-inductive electric log available but no dip meter log for the same interval. In solution of this problem, certain measured quantities designated as $r$ are equated to calculated quantities, $p$, until such time as the values of p and r are equal; at that time, the value required for equality is recorded as the output of the depth. These equations are as follows:

$$r = p$$

and where $p = \dfrac{NF}{D}$ and $r = \dfrac{\rho_A(\theta)|I_Z|}{\pi|G_S|}$

In FIG. 8, the measured quantity $r$ is given as the magnitude of the signal $|I_Z|$ coming from the $R_Z$ coil times the apparent resistivity $\rho_A(\theta)$ from the non-inductive E-log divided by a geometrical quantity derived from the construction principles of our device; namely, $\pi$ times the magnitude of $|G_S|$ (the instrument constant or geometric factor). In FIG. 8 the resistivity signal coming from the non-inductive E-log, $\rho_A(\theta)$, on chart 96, as read by head 97, is combined with the absolute magnitude of the $R_Z$ coil current $|I_Z|$ in multiplier 98. This in turn is divided in ratio box 99 by the above mentioned geometrical quantity $\pi|G_S|$, indicated as being a potential derived from battery 195, and potentiometer 196 through contact 197. The quantity r from the ratio bos is then fed into comparator 100.

At the same time, the other required quantity, p, is computed by a circuit called Box Q, shown in detail in FIG. 9 which enters the other side of comparator 100. In order to compute $p$, we need a constantly varying dip angle $\theta$ which is obtained from a sweep generator 101 sweeping voltage linearly from 0 to $\pi/2$. Sweep generator 101 generates a varying $\theta$ and feeds signals into sine and cosine generators, 102 and 103, respectively, and supplied to Box Q. In addition, another input to Box Q is the quantity $m$. It is simply obtained as shown in FIG. 5 by taking the ratio of the quadrature signal Iq to the absolute magnitude of $I_Z$. $m$ is independent of $\theta$. The output of Box Q is the quantity p given by the formula, $$p = \dfrac{\left[1 + \cos^2\theta + \dfrac{\sin^2\theta}{F}\right]\sqrt{F}}{\sqrt{\sin^2\theta + F\cos^2\theta}}$$

where $F = [m \sin^2\theta + \sin\theta \cos\theta/\sin\theta \cos\theta - m(1 + \cos^2\theta)]$ As $\theta$ is increased by sweep generator 101, $p$ is constantly computed in Box Q and fed into comparator 100; r, which is variable with $\theta$, is then compared with p and when the comparison of $r$ and $p$ is adequate, that is they are sufficiently equal to one another, a trigger signal is generated in comparator 100 and fed to sweep generator 101 shutting off the sweep and causing generator 101 via switch 104 to output the last value of $\theta$ on tape 105 through head 106. This value of $\theta$, which we call $\bar{\theta}$, is the solution of the system for the dip and it represents the solution of the equation $r = p$. This $\bar{\theta}$ output also may be used as input to the arrangement of FIG. 10 where through further processing we generate $\lambda$ and the absolute values of vertical and horizontal resistivity.

The details of Box Q are shown in FIG. 9 and include a group of interconnected analog circuits to calculate the right hand side of the equation given above for p. The input values $a$, $b$, $c$ (to Box Q) of FIG. 8 are illustrated as the input at the top of FIG. 9. As discussed above, the input $m$ is from FIG. 5 and is in fact the ratio of $I_Q$ to $|I_Z|$. The inputs $b$ and $c$ as indicated, are the cosine and sine values of $\theta$ produced by sweep generator 101 in FIG. 8. As a first operation these sine and cosine values are squared in units 145 and 146, respectively. The values are also multiplied together by multiplier 107. With these three inputs, $\cos \theta$, $\sin \theta$, and $m$, it is possible to produce the value $p$ from the above noted equation.

To avoid repetition in the description, the equation is defined for shorthand purposes as $N \times \sqrt{F/D}$. N in this case is the numerator and is equal to $1 + \cos^2\theta + \sin^2\theta/F$. $D = \sqrt{F} \cos^2\theta + \sin^2\theta$ and the value $F = [m \sin^2\theta + \sin \theta \cos \theta/\sin \theta \cos \theta - m(1 + \cos^2\theta)]$. Since the value F is used in both the numerator and the denominator, the circuit for producing it will first be described.

As indicated, the first term of F, namely, $m \sin^2\theta$ is generated by combining $m$ and $\sin^2\theta$ in multiplier 108. This value is then added to the second term of F's numerator, $\sin \theta \cos \theta$ by adder 109 which combines the outputs of multiplier 107 and multiplier 108. This value forms the input $a$ of ratio device 110 and is divided by the denominator which comes from combining $m$ with the value $1 + \cos^2\theta$. These values are derived from combining $\cos^2\theta$ with the value 1 in adder unit 111 whose input is a constant voltage, such as battery 112. Multiplier 113 then combines $m(1 + \cos^2\theta)$ for subtraction from the value $\sin \theta \cos \theta$ derived from 107 in subtractor unit 114. The output of ratio device 110 is then F which appears in both the numerator and the denominator of p.

In the numerator of p the value $1 + \cos^2\theta$ is, of course, derived from adder 111 and it is combined in adder 115 with the ratio $\sin^2\theta/F$ derived from ratio device 116, whose input is F from ratio device 110 and $\sin^2\theta$ from squarer 105.

To form the value D of the formula for p, the output of ratio device 110 is supplied to multiplier 117 where it is combined with the $\cos^2\theta$ from squarer 106 and then added to $\sin^2\theta$ by adder 118 to form the value $F \cos^2\theta + \sin^2\theta$. This value is then square rooted by device 119 and compared to the in ratio device F to the square root of F derived from square root device 120, to produce the value $\sqrt{F/D}$. The final value of p is then supplied by the multiplying $N \times \sqrt{F/D}$ in multiplier unit 122. This output is the input to Box Q and used in the equation solved by the circuit of FIG. 8.

FIG. 10 has $\bar{\theta}$ from FIG. 8, and $\bar{\lambda}$ as inputs, the anisotropy $\bar{\lambda}$ is also calculated from $\bar{\theta}$, which is fed into a device similar to the one shown in FIG. 5 (which used an actual dip meter) but in such a device, the signal is now $\bar{\theta}$ from the sweep generator 101 of FIG. 8. With $\bar{\theta}$ and $\bar{\lambda}$ thus given, FIG. 10 shows a method to correct the resistivity of a non-inductive recorded E-log (designated as $\rho_A(\bar{\theta})$) with dip present, in accordance with the equation:

$$\rho_A(0) = \frac{\rho_A(\bar{\theta}) \sqrt{\sin^2 \bar{\theta} + \bar{\lambda}^2 \cos^2 \bar{\theta}}}{\bar{\lambda}}$$

It also shows how to obtain true vertical resistivity $\rho_V$ from $\bar{\lambda}$ in accordance with the equation:

$$\rho_V = \rho_A(0) \bar{\lambda}^2$$

From the above equation it can be seen that $\rho_A(0)$ is written on record tape 125 by head 126 and is derived as a ratio of the recorded or apparent electric log resistivity $\rho_A(\bar{\theta})$ times the numerator and denominator of the above formula. The numerator is formed by a combination of the sine and cosine values of $\theta$ and $\bar{\lambda}$ in the following way. $\bar{\theta}$ is first resolved into $\cos \bar{\theta}$ and $\sin \bar{\theta}$, respectively, by cosine and sine generators 127 and 128. The values are then squared in units 129 and 130; the output of $\cos^2\theta$ from square 129 is then multiplied through multiplier 131 with $\bar{\lambda}^2$ derived from squarer 132. The outputs of multiplier 131 and 130 are then added to unit 133 to form the numerator. The square root of this value is extracted by unit 134 and combined with $\bar{\lambda}$ in ratio device 135 to form the value $\sqrt{\sin^2\theta + \bar{\lambda} \cos^2\theta}$. The ratio from unit 135 is then applied to another ratio device 136 to combine that value with the resistivity read from an actual E-log on chart 137 by head 138. The output of 136 is then applied to the true E-log resistivity printed on chart 125 as $\rho_A(0)$.

As indicated above, the true vertical resistivity value $\rho_V$ is then obtained by combining the value of $\rho_A(0)$ squared in unit 140 and multiplied by the value $\bar{\lambda}^2$ in multiplier 141 to produce the true vertical resistivity $\rho_V$ which is then inscribed on tape 142 by head 143. The true electric log resistivity corrected for dip, as indicated on 125 is, of course, also the true horizontal resistivity, assuming no dip in the formation.

While the units shown for conversion of the instantaneous values of logs in FIGS. 5, 6, 7, 8, 9, and 10 are indicated generally as analog devices, it will be understood that these values can be calculated by hand, or they can be calculated by digital computers which suitably digitize the individual value of each log at a particular depth and are then synchronized for the other values on similar logs and the values combined in the sequence specified in the drawings. In this regard, the flow diagrams and the extraction of the values from the variables are well known in computing art either in analog form, or in digital form. The preferred method, of course, is a digital computer; however, for simplicity of explanation and for a more ready understanding of the concept of how the information derived from a triple coil induction log can be used, the oresent representations have been selected.

Examples of sine or cosine resolvers, squarers, adders, subtractors, absolute value generators, square root extractors, multipliers, and ratio devices are given in Handbook of Automation, Computation and Control, Grabbe, Ramo, Wooldridge, Vol. 2, Computers & Data Processing, Chapter 23. These devices are well known in the electronic arts and their description would be superfluous to a man skilled in the art understanding the purpose and intent of such mathematical operations and to his utilization of the information to practice this invention.

From the foregoing discussion, it will be understood that various modifications and changes in the method will become apparent to those skilled in the art. All such modifications and changes coming within the scope of the appended claims are intended to be included in them.

I claim:

1. The method of determining the electrical anisotropy, $\lambda$, of earth formations having substantial dip relative to a borehole traversing said formations which includes:

a. suspending an unoriented array of coils, including a static transmitter coil and at least three static receiving coils in a borehole on a well logging cable, said static receiving coils having their respective axes aligned to intersect at a common center point and said axes being mutually perpendicular to each other with said common center point spaced apart a fixed distance from the center of said static transmitter coil and the spatial orientation of said static receiving coils being fixed with respect to said static transmitter coil, b. supplying said static transmitter coil with an alternating current at a frequency of from a few hundred Hz to 50 KHz to generate an alternating current magnetic field in said earth formations while transversing said cable to move said array of static coils over a given interval of said borehole to simultaneously detect the electrical currents induced in said three static receiving coils, c. recording over said given interval of said borehole signals representative of the inphase and quadrature current flows induced in each of said three static receiving coils by interaction of the current induced in said earth formations by said transmitter coil, said recording being in accordance with the depth of said coils in said borehole, d. traversing said given depth interval of said borehole with a dip meter log to record signals representative of the dip of said formations over said given interval, e. and from said recorded signals determining the electrical anisotropy $\lambda$ of said formations within said given depth interval in accordance with the formula:

$\lambda = \overline{\sqrt{\sin\theta\;(m\sin\theta + \cos\theta)/\sin\theta\cos\theta - m\;(1 + \cos^2\theta)}}$ where $\theta$ = dip angle of said formation from said dip meter log
   $m = \overline{\sqrt{(I_x^2 + I_y^2)}/|I_z|}$ $I_x$ and $I_y$ are the current flows in two of said receiving coils whose axes are perpendicular to said transmitter coil and $|I_z|$ is the absolute magnitude of the current flow in another of said receiving coils whose axis is parallel to the axis of said transmitter coil.

2. The method in accordance with claim 1 wherein the corrected true resistivity $\rho_A(0)$ of said dipping earth formations traversed by a borehole is determined from $\lambda$ and the recorded signals from an electric induction log representing resistivity $\rho_A(\theta)$ over said given depth interval in accordance with the formula:

$\rho_A(0) = [\lambda^2 + 1\;(\lambda^2 - 1)\cos^2\theta/2\lambda^2]\,\rho_A(\theta)$ 3. Method in accordance with claim 2 wherein the true vertical resistivity $\rho_V$ of said formations is determined in accordance with the formula:

$\rho_V = \rho_A(0)\lambda$

4. The method of determining the electrical anisotropy and dip of earth formations having substantial dip relative to a borehole traversing said formations which comprises:

a. unorientedly suspending a static transmitter coil and at least three static receiving coils in a borehole on a well logging cable so that the axis of one of said static receiving coils is generally parallel to the axis of said static transmitter coil and the axes of the other static receiving coils are mutually perpendicular to each other and to said one static receiving coil and substantially equally spaced at a fixed distance from said transmitter coil, b. supplying said static transmitter coil with an alternating current at a frequency of from a few hundred Hz to 50 KHz to generate an alternating current magnetic field in said earth formations while transversing said cable and said static coils over a known interval of said borehole to detect simultaneously currents induced in said three static receiving coils, c. recording signals representative of the inphase and quadrature current flows induced in each of said three static receiving coils by interaction of the current induced in said earth formation by said static transmitter coil, said recording being in accordance with the depth of said static coils in said borehole, d. traversing said known interval with an electrical logging array to generate a record of apparent resistivity $\rho_A(\theta)$ in said formations, e. and from said recorded signals determining both the electrical anisotropy $\lambda$ and the dip angle $\theta$ of said formations, said values being determined by iterating values of $\theta$ to establish the equality:

$r = p$ where $r = \dfrac{\rho_A(\theta)\,|I_z|}{\pi|G_s|} \quad p = \dfrac{NF}{D}$ $|I_z|$ is the absolute value of the magnitude of current flow in said static receiving coil parallel to said transmitter coil $\pi|G_s|$ is an instrument constant of said three coil system $N = [1 + \cos^2\theta + (\sin^2\theta/F)]$
   $D = \sqrt{\sin^2\theta + F\cos^2\theta}$
   $F = [m\sin^2\theta + \sin\theta\cos\theta/\sin\theta\cos\theta - m\;(1 + \cos^2\theta)]$
   $m = \sqrt{(I_x^2 + I_y^2)}/I_z$ $I_x$ and $I_y$ are the current flow in said other static receiving coils
   $\theta$ = dip angle of said formation and
   $\lambda = [\sin\theta\;(m\sin\theta + \cos\theta)/\sin\theta\cos\theta - m\;(1 + \cos^2\theta)]$ 5. The method of determining the electrical anisotropy, $\lambda$, of earth formations having substantial dip relative to a borehole traversing said formations which includes:

a. suspending an unoriented array of coils, including a static transmitter coil and at least three static receiving coils in a borehole on a well logging cable, said static receiving coils having their respective axes aligned to intersect at a common center point and said axes being mutually perpendicular to each other with said common center point spaced apart a fixed distance from the center of said static transmitter coil and the spatial orientation of said static receiving coils being fixed with respect to said static transmitter coil, b. supplying said static transmitter coil with an alternating current at a frequency of from a few hundred Hz to 50 KH$_z$ to generate an alternating current magnetic field in said earth formations while transversing said cable to move said array of static coils over a given interval of said borehole to detect simultaneously the electrical currents induced in said three static receiving coils, c. recording over said given interval of said borehole signals representative of the inphase and quadrature current flows induced in each of said three static receiving coils by interaction of the current induced in said earth formations by said transmitter coil, said recording being in accordance with the depth of said coils in said borehole, d. generating over said given depth interval of said borehole signals representative of the dip of said formations within said given interval, e. and from said recorded signals determining the electrical anisotropy $\lambda$ of said formations within said given depth interval in accordance with the formula:

$\lambda = \sqrt{[\sin\theta \, (m \sin\theta + \cos\theta)/\sin\theta \cos\theta - m \, (1 + \cos^2\theta)]}$ where $\theta$ = dip angle of said formation from said dip meter log $m = \sqrt{(I_X^2 + I_Y^2)}/ |I_Z|$ $I_X$ and $I_Y$ are the current flows in two of said receiving coils whose axes are perpendicular to said transmitter coil and $|I_Z|$ is the absolute magnitude of the current flow in another of said receiving coils whose axis is parallel to the axis of said transmitter coil.

6. The method of claim 5 wherein said dip angle of said formations is generated for said known interval by a conventional dip meter log.

7. The method of claim 5 wherein said dip angle of said formations is generated from an electrical logging array recording the apparent resistivity $\rho_A(\theta)$ for said known interval by iterating values of $\theta$ to establish the equality $r = p$ $$\text{where } r = \frac{\rho_A(\theta) |I_z|}{\pi |G_s|} \quad p = \frac{NF}{D}$$

$|I_z|$ is the absolute value of the magnitude of current flow in said static receiving coil parallel to said transmitter coil $\pi |G_s|$ is an instrument constant of said three coil system $N = [1 + \cos^2\theta + (\sin^2\theta/F)]$ $D = \sqrt{\sin^2\theta + F \cos^2\theta}$ $F = [m \sin^2\theta + \sin\theta \cos\theta/\sin\theta \cos\theta - m (1 + \cos^2\theta)]$ $m = \sqrt{(I_x^2 + I_y^2)}/ I_z$ $I_x$ and $I_y$ are the current flow in said other static receiving coils.

* * * * *